United States Patent [19]
Elsdon et al.

[11] Patent Number: 5,813,432
[45] Date of Patent: Sep. 29, 1998

[54] AUTOMATIC SHUT-OFF VALVE ARRANGEMENT

[75] Inventors: Stanley Robert Elsdon, Islington; Gordon Elford Fairles, Toronto; Arthur S. Cornford, Mississauga, all of Canada

[73] Assignee: Emco Wheaton Fleet Fueling Corp., Oakville, Canada

[21] Appl. No.: 334,205

[22] Filed: Nov. 4, 1994

Related U.S. Application Data

[63] Continuation-in-part of Ser. No. 167,222, Dec. 14, 1993, abandoned.

[30] Foreign Application Priority Data

Nov. 5, 1993 [CA] Canada ................................... 2.102.569

[51] Int. Cl.⁶ ............................. F16K 31/18; F16K 31/34
[52] U.S. Cl. ........................... 137/413; 137/415; 141/198
[58] Field of Search ..................................... 137/412, 413, 137/434, 430, 442, 443, 444, 415; 141/198

[56] References Cited

U.S. PATENT DOCUMENTS

| | | | |
|---|---|---|---|
| 2,731,030 | 1/1956 | Phillips | 137/413 |
| 2,867,232 | 1/1959 | Snyder | 137/413 |
| 3,144,056 | 8/1964 | Mosher | 137/413 |
| 3,625,264 | 12/1971 | Swain | 141/198 |
| 3,929,155 | 12/1975 | Garretson | 141/198 |
| 4,064,907 | 12/1977 | Billington et al. | 141/198 |
| 4,444,230 | 4/1984 | Van Mullem | 41/198 |
| 4,596,269 | 6/1986 | Stephens | 137/413 |
| 5,078,170 | 1/1992 | Henry | 137/614.06 |

*Primary Examiner*—George L. Walton
*Attorney, Agent, or Firm*—Woodcock Washburn Kurtz Mackiewicz & Norris, LLP

[57] ABSTRACT

This invention relates to an automatic shut-off valve arrangement for use in fluid transfer systems. In particular, the valve arrangement or assembly may be mounted in a fluid tank or other type of fluid containment zone to automatically shut off flow from a source, when the desired volume of fill is reached. The assembly is for use in automatic or semi-automatic fluid handling systems which include specialized nozzles and coupling systems which eliminate spillage in the process of connection and disconnection of the nozzle and the tank inlet. An automatic shut-off valve arrangement for use in fluid transfer operations which comprises an inlet and an outlet, means for securing the arrangement to a fluid container such that incoming fluid passes through the arrangement when entering the container, the inlet being opened and closed in response to application of external mechanical opening means and/or incoming fluid pressure, and the outlet being normally closed but opened in response to fluid flow through the arrangement to the container, level sensor flow control means, actuated in response to fluid in the tank reaching a predetermined level, and connected to a bleed passage provided with flow restricting means, and arranged to be in communication with incoming fluid and with operating means of a main valve located in a main valve chamber such that fluid back pressure from the level sensor flow control means acts upon the operating means of the main valve to close the main valve and the main chamber such that fluid is no longer delivered to the fluid container and the valve assembly is shut off.

7 Claims, 7 Drawing Sheets

AUTOMATIC SHUT-OFF VALVE ARRANGEMENT

This application is continuation-in-part application of Ser. No. 167,222, filed Dec. 14, 1993, abandoned the disclosure of which in incorporated herein by reference.

FIELD OF THE INVENTION

This invention relates to an automatic shut-off valve arrangement for use in fluid transfer systems. In particular, the valve arrangement or assembly may be mounted in a fluid tank or other type of fluid containment zone to automatically shut off flow from a source, when the desired volume of fill is reached. The assembly is for use in automatic or semi-automatic fluid handling systems which include specialized nozzles and coupling systems which eliminate spillage in the process of connection and disconnection of the nozzle and the tank inlet.

BACKGROUND OF THE INVENTION

The systems in which the present invention are employed may be generally characterized as fluid transfer systems in which fluids are transferred from one zone of containment to another and in which means are required for stopping the flow automatically when the fluid in the downstream zone reaches some predetermined level.

Typically, such systems are used for transferring fuel from a storage vessel to a vehicle. In the more sophisticated systems of this type, fuel is pumped from the storage vessel, through a flexible hose, to a nozzle which can be positively and removably connected in a leak proof fashion to the inlet of a fuel tank on the vehicle. Such systems are intended to prevent leakage of the transferred fuel to the environment by providing a pressure tight connection between the parts during operation, and by ensuring that the internal interface between the nozzle and the tank inlet are effectively sealed before the nozzle can be disconnected, thus providing a coupling with the purpose of eliminating spillage of fuel in the process of connection and disconnection of the two components.

An ancillary benefit of such systems is the prevention of theft or unauthorized diversion of fuel since flow is prevented unless the nozzle is properly connected to a mating vehicle tank inlet.

Automatic shut-off valves have been incorporated in such systems, but typically these are found in the nozzle. The valve is activated either by sensing a build-up of pressure in the vehicle tank, or by the blockage of air flow under suction from the vehicle tank back to the nozzle. There are a number of inherent disadvantages to such configurations as follows.

1. Sensitive mechanisms are required to sense the low level changes in pressure, or suction, in an otherwise rugged environment.

2. Frequent lubrication and other preventive maintenance is required to keep the internal mechanisms effectively operational.

3. Wear on the nozzle components is a function of the frequency of use. When large fleets of vehicles and/or frequent refuelling operations are involved, increased maintenance can become both a nuisance and a cost factor.

4. The operator can manually control the rate of flow which is not an efficient method of refuelling a vehicle.

The present invention seeks to address these problems in a number of ways.

SUMMARY OF THE INVENTION

In the present invention, an automatic shut-off valve assembly is located inside a vehicle tank or other zone of containment to give the following benefits.

1. Since there is a valve on each vehicle or zone of containment, the frequency of use of each valve is reduced by some very considerable factor.

2. Because the valve is within the protective environment of the tank or zone of containment, it is less liable to suffer damage from rough or careless usage.

3. The configuration of the assembly makes tampering virtually impossible.

4. The construction of the shut-off valve is such that lubrication is unnecessary. This feature, together with a greatly reduced frequency of operation eliminates the need for routine maintenance of the valve.

5. Activation of the shut-off valve to stop or prevent flow is brought about by level sensor flow control means which preferably is ruggedly constructed, and most preferably is a simple float mechanism which is not affected by variations of pressure within the tank or zone of containment.

6. The activation of the valve is a function of fluid pressure and flow rate through the valve, and fluid level in the tank or zone of containment. No mechanical resetting or triggering is required. The valve is either fully opened or closed.

7. Changing the location of the shut-off valve from the nozzle to "tank-side" means that the nozzle can be considerably simplified and reduced in weight.

8. To accommodate unusual vehicle geometry, a vehicle fuel inlet can be located some distance remotely from the vehicle tank.

9. The proposed structure is easy to manufacture and install, the latter requiring no unusual skills or expertise.

In addition to the above advantages, the mounting of the shut-off valve in the fuel tank inlet as described, allows the device the capability of handling a potentially wide range of fuel flows and delivery pressure from more than one fuelling station. For example, delivery pressures could typically range from 20–60 lbs./sq. in. while flow rates could typically range from 15–60 gal./min. While it appears unlikely that the highest flow rate would coincide with the lowest delivery pressure, it is desirable that such a condition could be accommodated.

The present invention provides an automatic shut-off valve arrangement for use in fuel transfer operations which comprises an inlet and an outlet. Means are provided for securing the assembly within the container such that incoming fluid passes through it when entering the container. The arrangement inlet is opened and closed in response to application of external mechanical opening means and/or incoming fluid pressure, and the outlet is normally closed but is opened in response to fluid flow through the arrangement. The level sensor flow control means may comprise an ancillary float actuated valve or a pilot valve or other valve means which is actuated in response to fluid in the tank reaching a predetermined level. A bleed passage is provided with flow restricting means in the valve arrangement, and is arranged to be in communication with the incoming fluid, and with the level sensor flow control means from which fluid back pressure is transmitted. The bleed passage is also in communication with a main valve having operating means that is located in a main valve chamber such that fluid back pressure from the bleed passage acts upon the operating means of the main valve. In this fashion, the main valve is closed as is the main chamber, such that fluid may no longer be delivered to the tank or zone of containment and the valve arrangement is shut off.

In a preferred form, the arrangement is a valve assembly, in which there may be provided an inlet chamber and an associated inlet valve, which controls flow to the inlet chamber, a main chamber and an associated main valve piston operating means, which controls flow to the outlet chamber from the main chamber, and an outlet chamber and an associated outlet valve. In this case, the bleed passage comprises a flow restriction section in communication with the inlet chamber, and being in communication with a volume chamber associated with the piston operating means of the main valve.

Operation of the assembly is such that a portion of the incoming fluid passes into the bleed passage when fluid flows through the assembly into the container, and out to the level sensor flow control means, which is open when fluid in the tank or zone of containment is low. When the level of fluid in the container reaches a predetermined level, the level sensor flow control means closes the valve and fluid back pressure through the bleed passage forces fluid through to the volume chamber of the piston operating means of the main valve, whereupon the main valve closes as the piston is displaced and fluid flow to the outlet chamber and the tank or zone of containment is stopped and the valve assembly shuts off, preventing fluid flow into the assembly and the container.

It should be noted that when the level sensor flow control means is open, pressure in the downstream end of the bleed passage is substantially lower than the valve inlet pressure. When the static pressure in the piston volume chamber is approximately equal to the valve inlet pressure, the differential area across the piston causes it to be displaced to close the main valve.

While this description focuses on installation of the arrangement in a fuel tank of a vehicle, it should be understood that the arrangement or assembly may be installed in a stationary fuel storage tank for a diesel engine, for example. Such installations would be the type used for inigation pumps and for emergency generators for hospitals and the like. The vehicles may be transportation vehicles of all types such as buses, trucks, ambulances and the like, as well as off road vehicles used in construction and mining, for example, earth movers and open-pit and underground mining vehicles. Railway equipment and marine vessels may also employ the arrangement or assembly of this invention. The arrangement or assembly may also be used in any system where fluid is transferred and automatic or semi-automatic shut off of fluid flow is required.

In a preferred form of this invention, the automatic shut-off valve assembly is installed in a fuel tank, and the assembly comprises an inlet and an outlet. Means for securing the assembly within the fuel tank are provided, as are means for connecting the assembly to level sensor flow control means located in the fuel tank which serves to activate the valve assembly to shut it off; the valve assembly has an inlet chamber and an associated inlet valve, a main chamber and an associated main valve with operating means, an outlet chamber and an associated outlet valve, and the valve assembly is accessible from the tank inlet. The inlet valve is opened and closed in response to the application or removal of external mechanical opening means and/or pressure of incoming fluid, and the inlet chamber communicates with a bleed passage in the valve assembly. The passage is provided with flow restricting means. The operating means of the main valve is in communication with the bleed passage, and the main valve is normally open to permit fluid flow to the main chamber from the inlet chamber, and moves to its closed position in response to fluid back pressure on the operating means from the bleed passage. The outlet valve is normally closed, but opens in response to fluid pressure from the main chamber. The flow path through the valve is such that during fuelling, the valves are open and permit flow into the tank, and some flow occurs through the bleed passage to the level sensor flow control means, which is open when the fuel level is low, and fuel flows into the fuel tank. When the level sensor flow control means closes, upon the tank being filled to a predetermined level, back pressure in the bleed passage causes an increase of pressure in the volume chamber which causes the main valve to close and to stop fluid flow into the outlet chamber, whereupon pressure on the outlet valve ceases and the outlet valve closes. As no pressure drop then exists across the inlet valve, in the absence of any external mechanical opening means, the valve closes.

In the preferred embodiment the level sensor flow control means is usually connected to the end of the bleed tube by means of a flexible tube, although other forms of connection means could be employed. The tube may be made from any suitable material which is flexible and fuel resistant.

The level sensor flow control means, and hence the preferred the float actuated valve assembly may be a separate unit from the shut-off valve. It is possible to incorporate the valve within the automatic shut-off valve assembly and to place the sensor means or float remotely or separately therefrom. It is preferably mounted close to the top of a vehicle tank, although other suitable arrangements will be apparent to those skilled in the art.

The preferred means level sensor flow control consists of two essential components—a valve and a float. The float may be made of cork or any other suitably buoyant material, and will be at the bottom limit of its travel as the fluid level in the tank rises, so that in its uppermost position it closes off the port in the valve.

Gravity biases the float in its open position. It is also preferable not to secure the flexible tubing directly to the float but rather to a lower part of a chamber which houses the float. This seems to provide for smoother operation of the float assembly.

Usually, the float actuated valve is placed in the tank and preferably a vented fuel or tank cap is secured over it. Such structures are well known in the art and many are available commercially. Examples are those caps which are sold by GT Development Corporation under the trade-mark SAFE-GARD. Details of suitable structures are found in the description of the preferred embodiment.

It will be apparent that many types of float actuated valve structures may be used in combination with the shut-off valve assembly of this invention. The requirements are that the device be simple in design to simplify manufacture and to ensure reliable operation. It will also be apparent to a person skilled in the art that a variety of means may be used to sense the fluid level including pneumatic, mechanical, optical, electrical, electronic, magnetic means or devices and equivalents thereof.

While in the embodiments described it is preferred that all elements of the valve assembly, namely the inlet and outlet valves, the main valve and the bleed passage with its flow restricting arrangement are all contained within the same structure, it is not essential that this be the case. In its most preferred form, the assembly does comprise the three valves and the bleed passage with its flow restricting arrangement. Further, it is also preferred to locate the assembly at the inlet of a fuel tank in which it is to be installed.

The location of the shut-off valve assembly in the fuel tank as opposed to in the fuel nozzle provides the advantage that the nozzle may be reduced in weight and simplified in design. The nozzle may now simply provide a manual shut-off valve for the disconnected fuel line. Such nozzle structures are known in the art. In use, the assembly of this invention is best employed with a dry-break coupling which ensures that fluid loss is minimized or eliminated. Devices which meet these requirements are available commercially. Typical of the type of dry-break device which may be used in conjunction with the shut-off valve of the present invention is that found in U.S. Pat. No. 5,078,170 issued Jan. 17, 1992 to Emco Wheaton, Inc., the disclosure of which is hereby incorporated herein by reference. These devices are of particular importance in the fields of application of this invention given the environmental and cost concerns relating to fuel spillage.

In a most preferred form of the invention, the inlet valve is a poppet tube with poppet guide means, the tube being biased in its normally closed position by suitable means, such as a spring. The poppet guide includes ports for permitting fluid to pass from the inlet chamber to the guide interior which is in communication with the bleed passage. The bleed passage is centrally located in the assembly and passes through all chambers. While it is essential that the bleed passage communicate with the main chamber, and with incoming fluid, it need not necessarily pass through the outlet chamber and be centrally located in the assembly.

The flow restriction means preferably is in two concentric sections, a first section which communicates with the inlet and comprises a metering tube and a metering pin which simply slows flow in the passage. The poppet guide is formed so that it also provides a housing for the piston of the main valve, which in effect, with a hollow piston interior, forms the volume chamber. This volume chamber is in communication with the bleed passage, but with the second section. Communication occurs through the annular passage which is formed between the exterior of the metering tube and the cylindrical channel formed in the assembly. The second section of the passage comprises a bleed tube whose end is aligned coaxially with the downstream end of the metering tube, but is displaceable laterally therefrom such that a space is formed between the two ends when a fluid back pressure situation occurs. This back pressure forces fluid back into the piston volume chamber which then displaces the piston and moves the main valve to its closed position.

Alternatives to the metering pin and metering tube for controlling flow and pressure drop through the bleed passage will be apparent to the person skilled in the art. A typical choice would be a form similar to the construction of a conventional fluid check valve. Such valves are normally used to prevent flow in one direction while allowing free flow in the other. The active sealing member may be a ball, or any other shape such as a conical or flat faced poppet. The flow rate, and consequently the pressure drop, through the device in the free flow direction is a function of spring pressure. Flow regulation will result by using a spring with a suitable force characteristic. Flow in the reverse direction is prevented by seating of the sealing member. While this may not be necessarily undesirable in the present arrangement, but it can be overcome by preventing the sealing member from being in full contact with its seat.

Other methods of controlling flow and pressure drop— such as an adaptation of the common needle valve or even a single very small orifice—are possible. The present design has been selected, namely the combined metering pin and metering tube for two principal reasons:

resistance to plugging. At the entrance to the assembly of pin and tube, the cross section of the annular flow passage is effectively a narrow but wide slot in hydraulic terms. This considerably reduces the potential for obstruction to flow by foreign objects in the fluid being handled.

simplicity in design and manufacture. By making the flow passage between the metering pin and metering tube of sufficient length, a larger radial clearance between the two is possible (for any specified drop). This results in greater ease of manufacturing to normal production tolerances.

In operation, the following sequence occurs, this operation being described with reference to one of the preferred forms of the invention. When the fuel tank is empty or contains a small amount of fuel, the main valve is in its normally open position. The inlet poppet valve remains in its normally shut position closing the interior of the valve and the fuel tank to the outside. Residual fuel may remain in the valve body but it is at the same pressure as the fuel in the fuel tank. The outlet poppet valve is closed precluding fluid flow from the main chamber to the outer chamber. The bleed passage may contain residual fluid, but again at the same pressure as in the remainder of the valve assembly and the tank. The float valve is also open in this instance.

To start refuelling, the fuel nozzle is connected to the inlet of the fuel tank, usually through a coupler which eliminates spillage in the process of connection and disconnection. The valve of the nozzle is opened and the hydrostatic head of the supply line displaces the inlet poppet tube or the valve is manually displaced by the fuel nozzle or other means and fluid flows under pressure into the valve inlet through a fine mesh screen, if required. Fluid pressure in the inlet chamber forces fluid to flow into the bleed passage from the inlet chamber and travels through the bleed passage, with the flow restriction means, into the connecting tube to the float valve where the fluid flows out into the tank. Regular flow proceeds through the valve body with the hydrostatic pressure being sufficient to open the outlet poppet to permit fluid flow from the main chamber to the outlet chamber. The function of this valve is to maintain a reasonably constant pressure differential between the interior of the shut-off valve assembly and the discharge to the tank. The valve is not called upon to block flow in the reverse direction and is not required to have a pressure tight seal. When the fluid level in the tank rises such that the float valve is closed, flow from the bleed passage is blocked and static pressure in the passage will increase and fluid back pressure causes a build up of fluid in the bleed passage in the space between the first and second flow restriction sections, such that fluid flows through the annular clearances in the second flow restriction section back towards the volume chamber in the piston, displacing the piston and closing the main valve and stopping flow from the inlet chamber to the main chamber. With flow into the tank then stopped, the pressure on the outlet valve ceases and the valve moves to its normally closed position. At this time there is also no pressure differential across the inlet valve, since flow to the tank is stopped by the main valve, and so the inlet valve may return to its normally closed position, unless there is some mechanical opening means preventing it.

DESCRIPTION OF THE PREFERRED EMBODIMENTS

Figure 1:
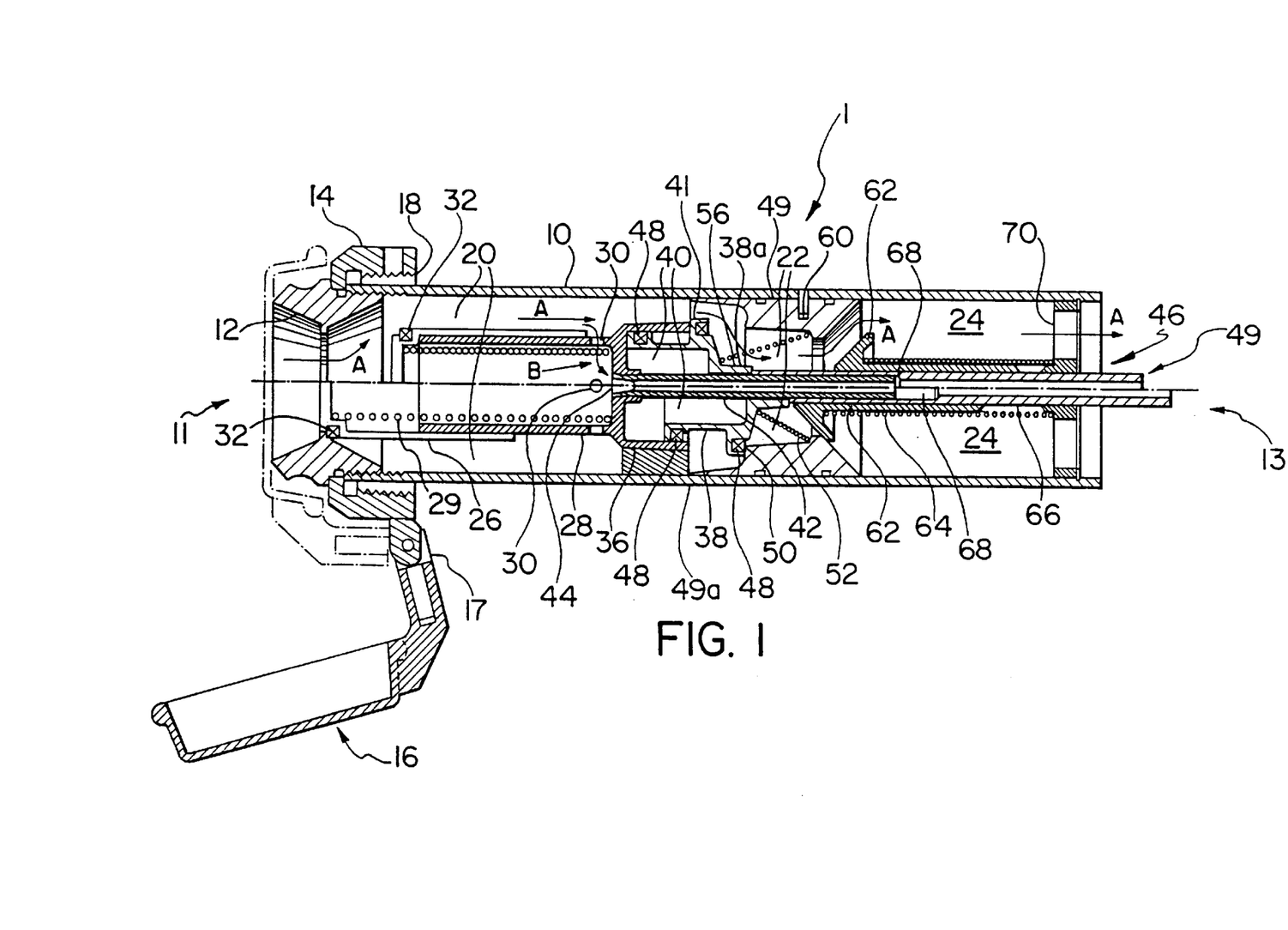
FIG. 1 is a longitudinal cross-section of an automatic shut-off valve of the present invention shown with its adapter and cap for mounting in a fuel tank inlet, the upper and lower halves of the Figure show the valve in open and closed positions, respectively.
Figure 5:
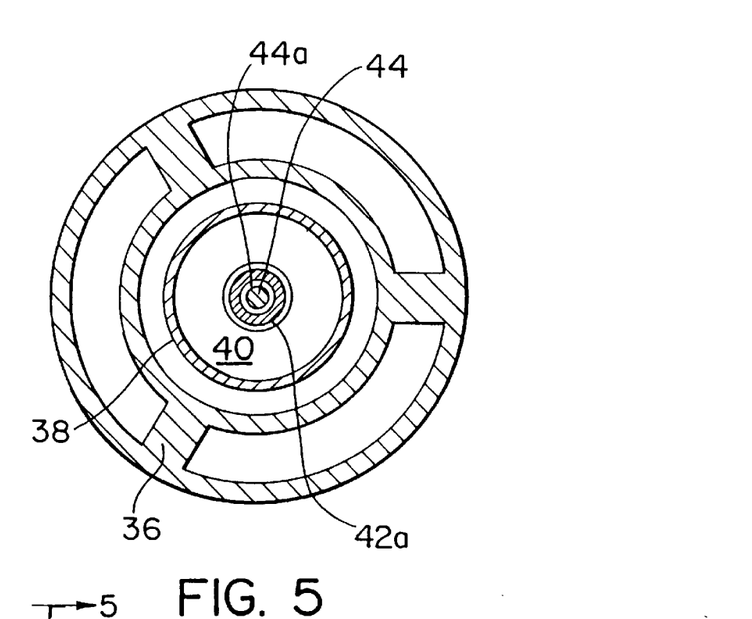
FIG. 5 is a cross-section through FIG. 6 along line 5—5, through the piston area.
Figure 6:
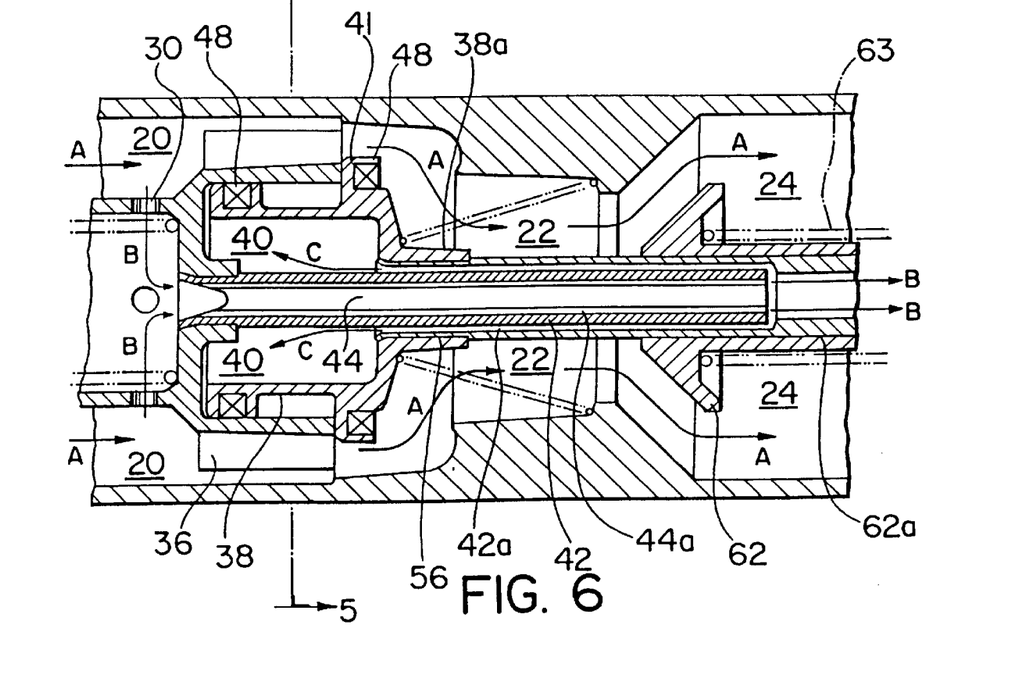
FIG. 6 is an enlarged longitudinal partial section showing flow passages through the valve assembly shown in FIG. 1.

Referring now to FIG. 1 of the drawings, there can be seen a longitudinal cross-section of an automatic shut-off valve assembly designated generally at 1. The flow passages in valve assembly 1 are further illustrated in FIGS. 5 and 6 and reference should be made to these figures as needed throughout this description. The upper and lower halves of FIG. 1 illustrate the valve assembly 1 in open and closed positions, respectively, and FIG. 6 shows it in an open position. The valve assembly 1 comprises a valve body 10, typically made from drawn steel tubing, which is provided at its inlet, generally indicated at 11, for mounting the valve in a fuel tank inlet (not shown) with an inlet adapter 12 and an adapter nut 14, each usually made of bronze. The tank inlet is closed with the valve assembly 1 which includes a dust cap 16, generally of steel provided with usual tension means, in this case spring 17, for ensuring that it remains securely shut when closed. Adapter nut 14 is secured to the tank by means of screw threading shown at 18. Valve body 10 includes an inlet chamber 20, a main chamber 22 and an outlet chamber 24. Inlet chamber 20 houses an inlet poppet tube 26 which is normally biased, by suitable means, such as a spring 29 (usually a helical compression steel spring) as shown herein, in its closed position. Inlet poppet tube 26 serves to close and seal the inlet 11 of the shut-off valve assembly 1 and the fuel tank (not shown) in which it is located. Inlet poppet tube 26 is provided with sealing means 32, which preferably comprises an annular elastomeric seal of a material which is fuel resistant, around its end to ensure that it seats against the inlet adapter, which is shaped to receive the seal 32 to seal the inlet as required in such installations.

The pressure in the biasing means 29, usually a spring, and in this case a helical compression steel spring, is predetermined such that upon application of pressure via a fuelling nozzle (not shown) and fuel being delivered under pressure, the poppet 26 will be displaced along its longitudinal axis to permit entry of fluid into the inlet chamber 20. The fluid flow path through the valve when entering the tank is marked with arrows which bear the letter A in FIGS. 1 and 6. Arrows B show fluid flow through bleed passage 46 and back pressure flow is shown by arrows C. When poppet tube 26 is displaced away from the inlet opening, it is guided along inlet poppet valve guide 28. The lengths of the poppet tube 26 and valve guide 28 are selected such that ports 30 located in the inlet poppet valve guide remain exposed and thus fluid may flow from inlet chamber 20 to the interior of inlet poppet valve guide 28, which is hollow and communicates with a bleed passage designated generally at 46. The inlet poppet tube 26 and inlet poppet valve guide 28 are sized such that each slides smoothly, one over the other and necessarily, the inlet poppet tube is hollow for this purpose.

An end portion 36 of the inlet poppet valve, guide acts as a piston chamber for piston 38 and valve 41. It also provides an entrance for bleed tube 66. The entrance is provided by virtue of a circular aperture 46a (see FIGS. 11, 12 and 13) and cylindrical extension 46b thereof, which extends in the direction away from the poppet guide 28. The size of this aperture 46a is such that it receives a metering tube 42 which is sized to receive a metering pin 44 in a wedge-like fashion. Metering tube 42, pin 44 and aperture 46a and bleed tube 66 are selected such that annular clearances are provided between one and the other in order for fluid to pass between all surfaces. The metering tube 42 and pin 44 comprise the first section of the flow restricting means. It should be noted that a multiple number of ports 30 is provided in inlet poppet valve guide 28 to provide good communication and adequate fluid flow into the bleed passage 46 while fluid is entering the fuel tank, as will be described in detail later. All interior valve parts are usually made of fuel resistant plastic such as materials sold under the trade-marks DELRIN and CELCON. The metering pin 44 is typically stainless steel and the metering tube is usually drawn stainless steel.

The piston 38 includes a volume chamber 40 for receiving fluid from the bleed tube 66. As indicated, piston 38 is guided and retained within piston housing or chamber 36 which is formed in the end portion of inlet poppet valve guide 28. The piston 38 is secured to the bleed tube 66 at region 56. Main valve 41 is normally biased by means of a spring 52, which in this instance is a conical, helical compression spring, in an open position which permits flow of fluid from inlet chamber 20 to main chamber 22. Seals 48 are provided at upper and lower regions of the piston 38 to permit the piston 38 either to seal off the valve assembly 1 with respect to flow between chambers 20 and 22 or to move freely therein. The piston 38 includes a narrower diameter portion 38a and in this area there is provided an enlarged annular area 56 for fluid passage to the piston volume chamber 40. It is in this area or region 56 that the piston 38 is secured to bleed tube extension 64, which surrounds metering tube 42 creating a channel or annular passage 42a which leads into volume chamber 40. The adjacent portion of the bleed tube 66 extends to and through outlet 13 of valve body 10. Bleed tube 66 is secured to the interior of piston 38, at its left hand end, such that it is displaced therewith. A space 68 is provided between bleed tube portion 66 and the end of metering tube 42. Poppet 62 is provided with a central cylindrical bore 62a for receiving metering tube 42 and bleed tube 66. Poppet 62 slides independently over bleed tube 66. When a fluid back pressure situation occurs in the bleed passage 46, fluid accumulates in space 68 and as pressure increases, back pressure results in fluid building in volume chamber 40 which then displaces piston 38 which closes main valve 41. Normally, outlet poppet 62 is biased, in this case by means of a spring 63, in a closed position. The function of this outlet poppet 62 is to maintain a reasonably constant pressure differential between the interior of the shut-off valve assembly and the discharge to the tank. The poppet 62 is not called upon to block flow in the reverse direction and is not required to have a pressure tight seal.

It will be noted that general valve seat 49 includes valve seat portion 50 for receiving seal 48 of valve 41. The material of valve seat 49 is selected such that the interface between the head of poppet 62, which in this case is a conical shape forms a seal with valve seat 54.

Many float actuated valve structures are known and any design may be employed as long as it will function in the environment, usually a fuel tank of a vehicle which must perform in all types of weather. It must be fuel resistant and must be simple for ease of manufacture and reliability.

Figure 2:
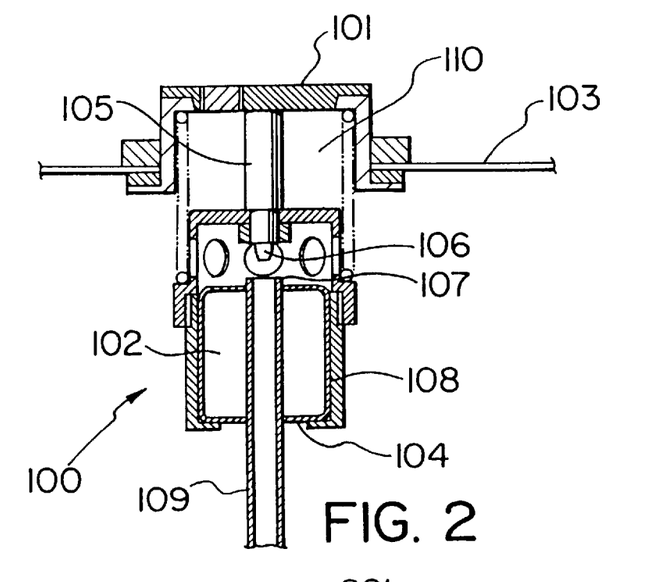
FIG. 2 is a cross-section of a float valve shown mounted in a fuel tank.
Figure 3:
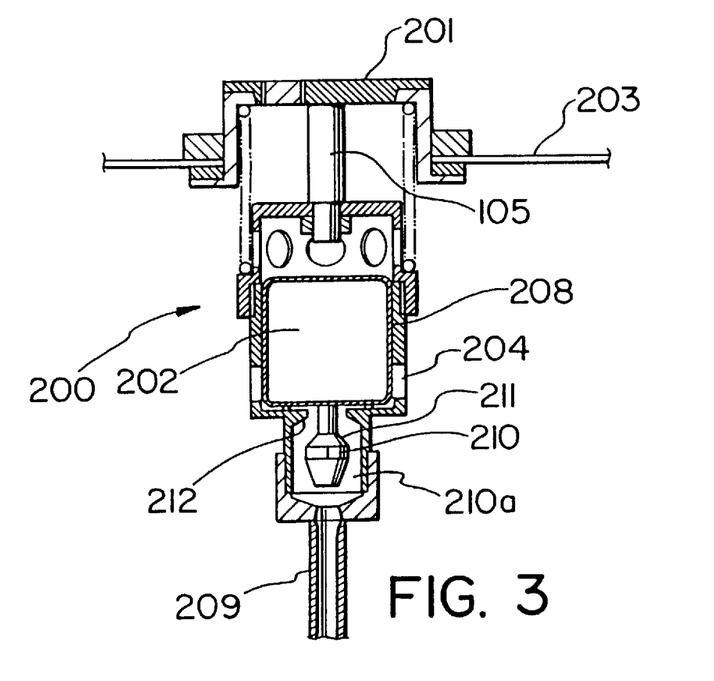
FIG. 3 is a cross-section of an alternative float valve shown mounted in a fuel tank.

Referring now to FIGS. 2 and 3, there are shown two alternative designs for float actuated valves which may be used with the valve assembly. Referring first to FIG. 2, there is shown generally at 100, a float actuated valve. The valve 100 is located at a vented outlet 110 in a fuel tank 103. The valve is secured to a cap assembly 101 by means of a bolt 105. The cap may also be installed by simply bolting it to a top portion of fuel tank 103 without use of this cap assembly 101. The cap assembly 101 may be selected from any of those available commercially which provide high capacity pressure venting, bulk fluid temperature sensitive thermal venting and anti-spill breather venting. It will be apparent that the use of the cap assembly 101 provides ready access to the float actuated valve 100, for installation and maintenance. Float 102 may be made of cork or other buoyant substance which is fuel resistant, and is located in valve chamber 108 which is sized to receive the float 102 to move freely up and down in the chamber 108. Tube 109 which connects to a bleed passage in a valve assembly as shown in FIG. 1, extends through the centre of float 102 so that when float 102 rises as a result of fuel entering bottom opening 104 in valve chamber 108, the top 107 of tube 109 contacts base 106 of the bolt 105 to seal off the bleed passage.

In FIG. 3, the float actuated valve, designated generally at 200 has a very similar structure to that shown in FIG. 2. Thus float 202 is housed within float chamber 208 which has side openings 204 which permit fluid to enter and move the float upwardly. Rather than tube 209 being directly connected to the float, a float extension 210 and float extension chamber 210a are provided, to which tube 209 is secured. Shoulders 211 of float extension 210 rest against seats 212 in the upper part of chamber 210a to seal off the bleed passage, when the float 202 rises upwardly.

Figure 4:
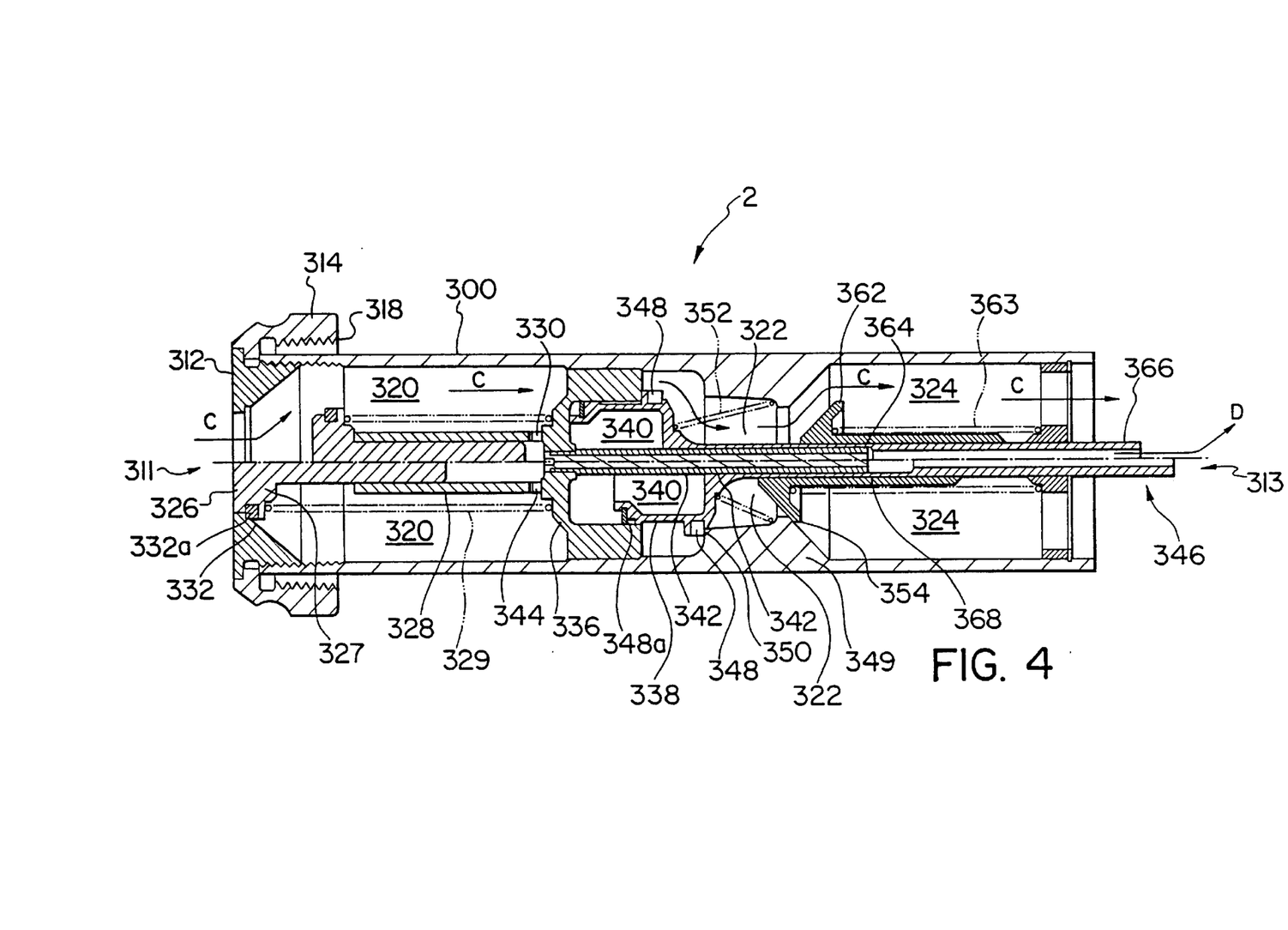
FIG. 4 is an alternative embodiment to the valve of FIG. 1 shown in longitudinal cross-section.

Referring now to FIG. 4 of the drawings, the upper half of the drawing shows a shut-off valve, designated generally at 2, in open position and the lower half illustrates valve 2 in closed position.

The design of this valve is substantially the same as the shut-off valve as shown in FIG. 1, with the exception that the inlet poppet 326 is of an alternative construction. In this construction, inlet poppet 326 is a solid body of cylindrical shape sized to reciprocally slide within inlet poppet guide 328. Spring 329 biases the inlet poppet 326 in its closed position. The inlet end 327 of the poppet 326 is enlarged relative to its main body portion 325 to provide a closure for the valve 2 and the tank inlet (not shown) when mounted therein. The top of spring 329 rests against a flange 327a on end 327 of poppet 326. The other side of this flange 327a provides a recess 332a for a seal 332. Ports 330 are provided in poppet guide 328 to allow passage of fluid from inlet channel 320 into a bleed passage designated generally at 346. Piston 338 is also of a slightly different shape at its open end and the arrangement for locating seal 348a which is of a different shape is necessarily altered. All other parts of the structure are the same as for the assembly of FIG. 1. In this instance, the parts have been labelled and the numbers correspond except for the digit 3 used for the assembly of FIG. 4.

Figure 7:
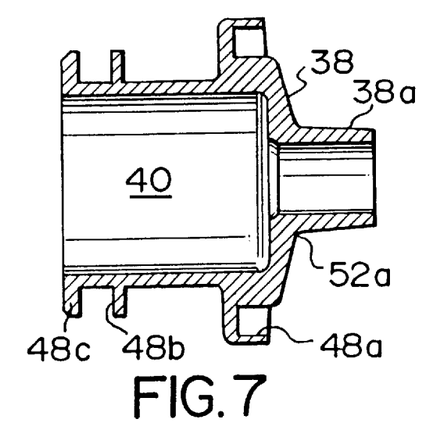
FIG. 7 is a longitudinal cross-section of a piston used in the valve of FIG. 1.
Figure 8:
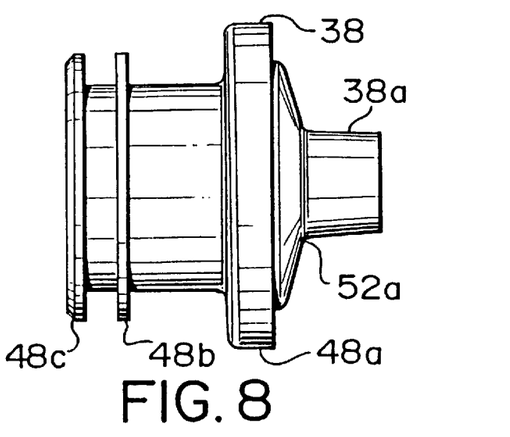
FIG. 8 is a side view of a piston used in the valve of FIG. 1.

FIGS. 7 and 8 illustrate a longitudinal cross-section and a side view of piston 38 as found in valve 1 of FIG. 1. Piston 38 is generally cylindrical in shape and has an open-ended cavity 40 which acts as a volume chamber during operation of the shut-off valve. Portion 38a is narrower in exterior diameter and receive and secures bleed tube 66. Upper exterior flanges 48b and 48c provide a recess for receiving an annular seal 48. Another overhanging flange 48a is provided at a point just before the piston narrows to provide a recess for another annular seal 48 which seats piston 38 upon piston seat 50 providing a seal between chambers 20 and 22. Spring 52 rests at 52a which is the top of what could be called the neck of the piston.

Figure 9:
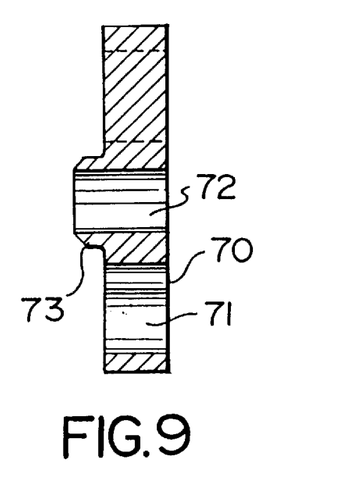
FIG. 9 is a transverse cross-section of an outlet poppet retainer in the valve of FIG. 1.
Figure 10:
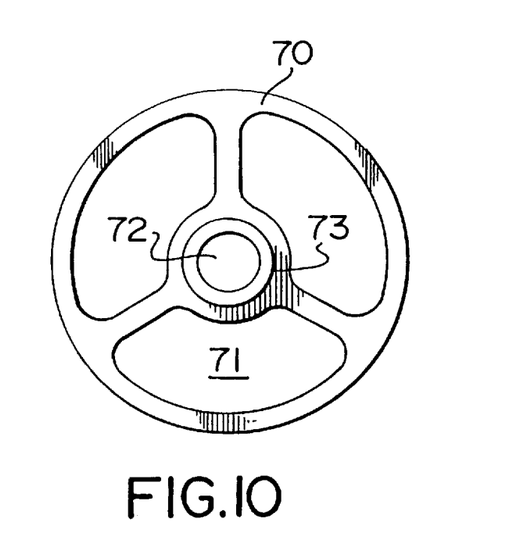
FIG. 10 is a top view of the outlet poppet retainer as shown in FIG. 9.

FIGS. 9 and 10 illustrate a diametrical section through poppet outlet retainer 70 and a top view thereof, respectively. The retainer 70 has a central aperture 72 which is sized to receive bleed tube 66 and is provided with a circumferential flange 73 which provides a stop for outlet poppet 62, retaining it in place within valve body 10. Spring 63 rests on either side of flange 73. Apertures 71 are provided in poppet outlet retainer 70 which in this instance are three, and elongate in shape to allow flow out of the shut-off valve assembly 1 into the tank (not shown). It will be apparent that bleed tube 66 when placed within aperture 72 provides a guide or path of travel for outlet poppet 62.

Figure 11:
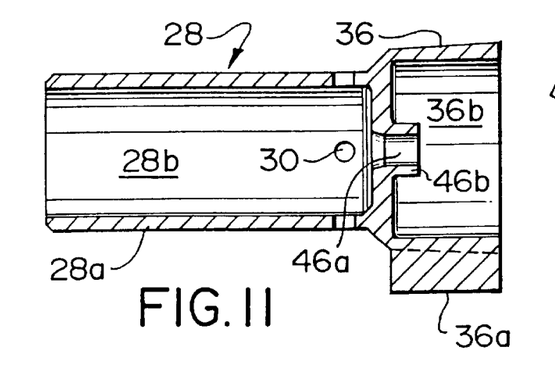
FIG. 11 is a longitudinal section of an inlet poppet guide in the valve of FIG. 1.
Figure 12:
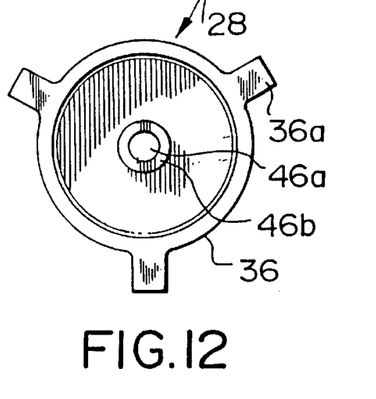
FIG. 12 is an end view of the inlet poppet guide of FIG. 11.
Figure 13:
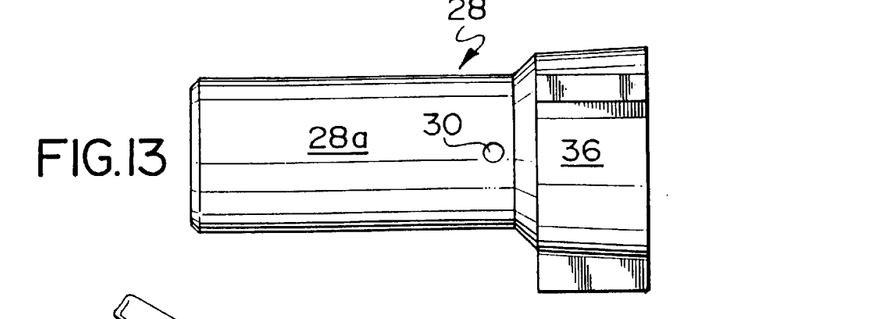
FIG. 13 is a side view of the inlet poppet guide of FIG. 12.

FIGS. 11, 12 and 13 illustrate the inlet poppet valve guide 28 found in valve 1 of FIG. 1. Guide 28 is generally an open-ended cylinder. Narrower portion 28a is sized so that poppet inlet tube 26 slides easily back and forth thereover. Its length is such that tube 26 when fully open does not cover ports 30 which permit passage of fluid into bleed passage 46. A flanged central aperture 46a (flange 46b) provides entrance to bleed passage 46. It is sized to receive metering tube 42 which receives metering pin 44 as previously described. Tube 42 is secured in the aperture 46a such that fluid flow may not occur therebetween. An end portion 36 of guide 28 forms piston housing or chamber 36 which is sized to slidingly engage and receive within, piston 38, which surrounds bleed tube 66. On the exterior of end portion 36 are a series of, in this case three, rectangular vanes which are sized to allow guide 28 to rest within valve body 10 so that guide 28 lies adjacent top edge 49a of general valve seat 49. This structure permits flow through valve body 10 and ensures that inlet poppet guide 28 is maintained in an axially aligned position, within valve body 10. The ends of lower portion 36 of guide 28 provide a stop for piston when it is in open position.

Figure 14:
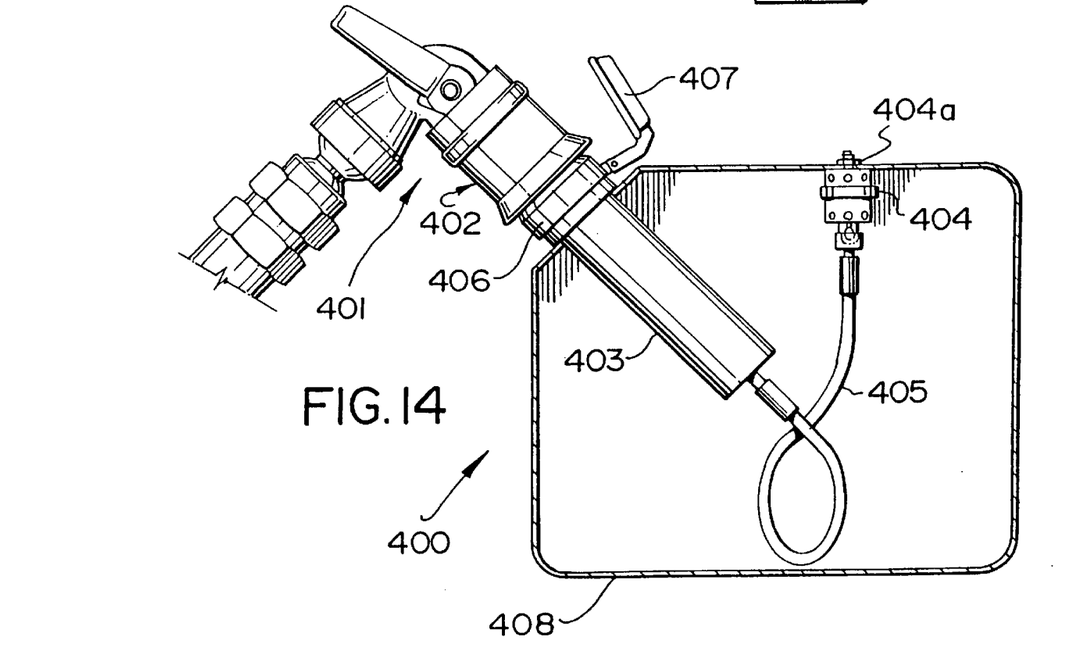
FIG. 14 is a schematic showing a fluid transfer assembly which includes a nozzle, a dry-break coupler, a valve assembly according to the invention mounted in a fuel container and a float actuated valve.

In FIG. 14 of the drawings, there is shown in schematic fashion an assembly for transferring fluids designated generally at 400. A fuel nozzle 401 of known construction is secured to an inlet 406 of a fuel tank 408, through a dry-break coupler 402 of known construction. The dry-break coupler 402 is secured to inlet 406 after cap 407 is opened. To inlet 406, there is secured an automatic shut-off valve assembly 403 as already described. Valve assembly 403 is connected via flexible tubing 405 to a float actuated valve 404 located at the top of fuel tank 408. In this instance, valve 404 is secured by means of a bolt 404a rather than with a special venting cap as described earlier.

Figure 15:
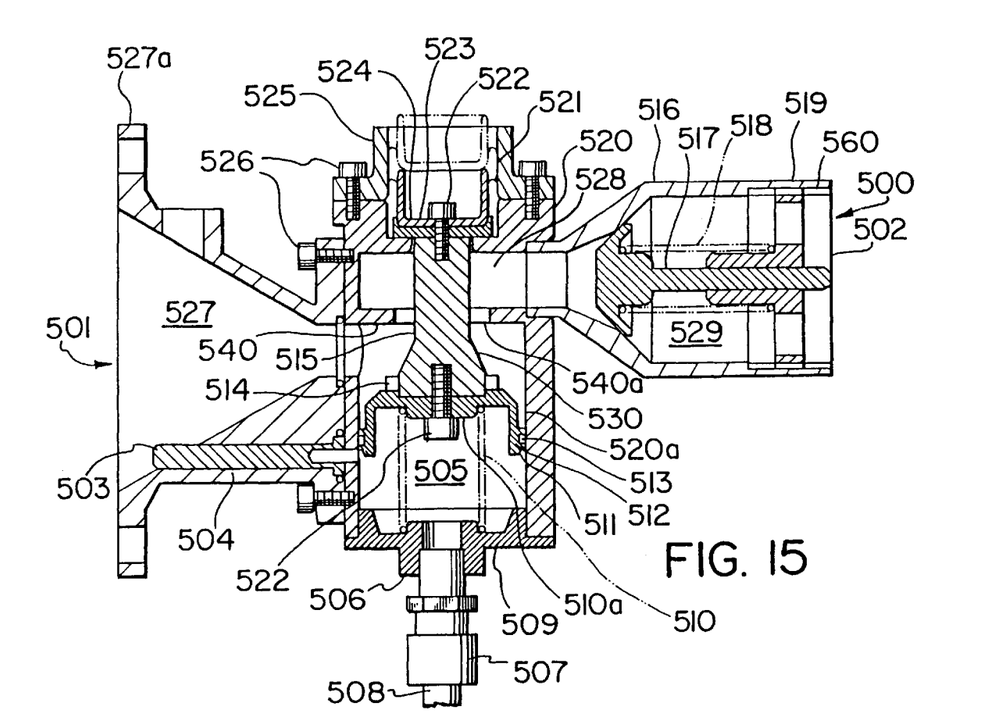
FIG. 15 is an alternative embodiment of the valve assembly of the present invention, shown in longitudinal cross-section.

In Figure 15, there is shown an alternative structure for the automatic shut-off valve assembly of the present invention. In this structure, there is provided a valve assembly designated generally at 500, having an inlet 501 and an outlet 502.

The inlet 501 leads into inlet chamber 527 which communicates with a bleed passage 503 which includes a metering pin 504 which thus provides flow restriction to a bleed passage chamber 505 from which leads to a bleed passage outlet 506 to which is secured a flexible tubing 508. Tubing 508 is secured to the outlet 506 by means of securing means 507, and leads to a level sensor flow control means or valve or preferably a float actuated valve as described previously but is not shown here. The inlet chamber 527 leads to a main chamber 528 and flow therebetween is controlled by a main valve 530. The main part of valve body 520 has an end piece 525 open to internal atmosphere of the tank and a lower closing space 509. The main valve 530 may be considered as a single functioning entity in which a spool 515 travels axially. The valve body 520 internal diameter is larger at one end than the other, and at the larger end the spool 515 incorporates a piston 511 which carries on its outer diameter a low friction reciprocating type seal 513. The seal 513, in turn, slides in the bore 520a of the valve body 520.

Near the centre of the valve body 520, an inturned flange 540 is shaped to form a seat 540a for a face seal 514, preferably a quad seal, which is secured to the back of the piston 511, so that when the latter is driven towards the seal seat 540a, either by spring (510) pressure or hydrostatic pressure on the piston face 510a, the sealing action prevents fluid flow through the body of the valve, i.e. into main chamber 528.

At the other, smaller diameter, end of the valve body 520, a commercially available rolling diaphragm 521 is attached to the end of the spool 515 to form a "zero friction" seal and to centre the spool 515 in the bore 520a. This arrangement effectively contains the fluid within the body of the shut-off valve assembly 500 at this end while allowing free movement of the spool 515 in reaction to the pressure and force differentials which may exist in the valve body 520.

An outlet poppet valve 560 receives the fluid flow from the outlet port 502 of the shut-off valve assembly 500 and discharges it into the tank (not shown), either directly or through a diffusion conduit of some kind (not shown). The function of this valve is to maintain a reasonably constant pressure differential between the interior of the shut-off valve assembly 500 and the discharge to the tank (not shown). In its construction, it resembles a conventional check valve with a spring (518) loaded poppet 517 and guide 519 which can be displaced by upstream fluid pressure. However it is not called upon to block flow in the reverse direction and is not required to have a pressure tight seat.

The shape and dimensions of the flow path through the outlet poppet valve 560 and the spring 518 are chosen so that at the lowest expected flow rate, the poppet 517 will be displaced a small amount to provide a narrow annular orifice with a pre-determined pressure drop. Whatever static pressure is developed at the poppet face due to this pressure drop will be balanced by the force of the spring 518 to bring the forces into equilibrium.

It will be noted that the internal diameter of the outlet poppet valve body 560 increases in the direction of flow so that the further the poppet 517 is displaced, the greater the cross-sectional area of the annular orifice (and consequently the lower the pressure drop at any fixed flow rate). As a result, if the flow rate should be higher, up to the maximum expected, the initial high pressure drop across the poppet 517 will cause a greater displacement of the latter until the forces are again in balance. Since the reactive force of the spring 518 under this condition would obviously be greater than under the low flow condition, a somewhat higher pressure drop would result. By judicious selection of the spring 518 rate and its dimensions, the difference in pressure drop between high and low flow conditions can be held to a few pounds per square inch.

Operation of the valve assembly of this embodiment is in principle very similar to the operation of the earlier described structures. However, this description will highlight the particular differences.

Starting from a condition in which the vehicle tank fluid level is low, the main valve assembly 520 will be empty or will contain residual fluid at the same pressure as the fuel tank interior (not shown), the shut-off valve 520 will be held by spring (510) pressure in its closed position; the outlet poppet valve (560) will be in its closed position; and a tank inlet adapter poppet (not shown) will be closed, creating a seal between the tank interior and the environment. An associated float actuated valve will be open at this point.

To start refuelling, a nozzle will be connected to the inlet adapter which incorporates means to eliminate spillage (not shown) and the nozzle manual shut-off valve (not shown) opened. This will allow the hydrostatic head of the supply line to displace the inlet adapter poppet, and the fluid to flow under pressure into the valve inlet section or chamber 527 (through a fine mesh screen if necessary).

The pressure in the valve inlet chamber 527 will cause a small flow of the fluid through the bleed passage 503 into the bleed passage chamber 505 of the shut-off valve body 520 and thence, by way of the tubing 508, to be discharged through valve openings into the tank. The dimensions configuration of the bleed passage 503 are such that there will be a high pressure drop between the valve inlet section and the end cavity of the shut-off valve body. The shape and dimensions of metering pin 504 is selected accordingly to provide appropriate flow rates. Consequently the fluid pressure in the cavity will be of a low order.

A differential pressure will appear across the piston 511, of sufficient magnitude to compress the spring 510 and cause the spool assembly 515 to move to open the shut-off valve 530 and thus permit fluid flow into the downstream chamber 528 of the shut-off valve body and thence the outlet poppet valve 560 into the tank.

As explained above, the pressure drop across the outlet poppet valve 560 will create a back pressure in the shut-off valve body 520 and this will serve to hold the shut-off valve spool 515 in the open position against the spring 510.

When the tank fluid level rises sufficiently to cause the float to close its associated valve, flow from the shut-off valve cavity 528 will be blocked and static pressure in the cavity will increase due to its connection through the bleed passage with the valve inlet chamber 527. Eventually, the cavity press will be of the same order as that in the main chamber 528 of the shut-off valve 530. Because of the differential areas of the piston faces and the spring 510 pressure, the forces acting on the spool 515 will be unbalanced causing the spool 515 to move to close the shut-off valve 530.

With no flow through the shut-off valve 530 or the level sensor flow control means or valve or float valve (not shown), there will be no pressure drop across the tank inlet adapter and its spring will move the poppet into the closed position. Closing the manual nozzle valve would have the same effect. None of these structures are shown. With the manual nozzle valve closed, the nozzle can be disconnected from the tank inlet adapter with a dry break.

Figure 16:
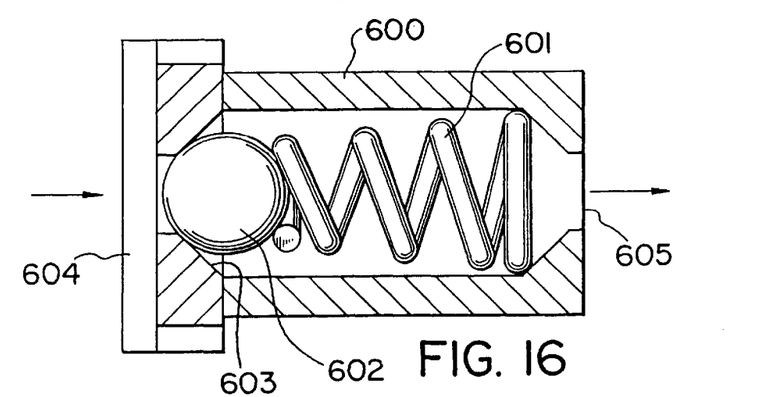
FIG. 16 is a check valve which may be used in place of a metering pin and a metering tube illustrated in the previous figures.

Referring to FIG. 16 of the drawings there is illustrated a greatly enlarged view in longitudinal cross section of check valve which may be used in place of the metering pin and metering tube described earlier. Valve housing 600 has openings 604 and 605, which are an outlet and an inlet, respectively. The outlet 604 is closed by means of ball 602 which is held closed normally by spring 601. The valve housing would be placed in a similar location to the metering tube 42 and metering pin 44 as described earlier.

It will be apparent from reading this description of preferred embodiments that many modifications or alterations may be made without departing from the spirit and scope of the invention as defined in the following claims, which are meant also to encompass all equivalent forms of the invention as would be apparent to a person skilled in the art.

We claim:

1. An automatic shut-off valve for use in fluid transfer operations, comprising:

a valve body having an inlet end and an outlet end;

mounting means for mounting said valve body to an opening of a fluid container so that fluid entering the container must pass through said valve body;

first valve means for permitting fluid to enter said inlet end of said valve body;

main valve means, downstream of said first valve means within said valve body, for precluding fluid flow through said valve body when closed, said main valve means comprising:
   a piston;
   a volume chamber, expansion of which will extend said piston to close said main valve means;

a metering tube for metering fluid from a location upstream of said main valve means to a location that is downstream of said main valve means;

a bleed tube, positioned about said metering tube, defining in part a bleed passage, said metering tube and said bleed tube further defining a passage therebetween that is in communication with said volume chamber; and level sensor flow control means for restricting flow through said bleed passage, whereby back pressure will develop within said bleed tube, and fluid will build up in said bleed tube and be introduced into said volume chamber through said passage that is defined between said metering tube and said bleed tube, thereby closing said main valve means.

2. A shut-off valve according to claim 1, further comprising means for maintaining a reasonably constant pressure differential between an interior of said valve body and the container.

3. A shut-off valve according to claim 2, wherein said means for maintaining a reasonably constant pressure differential between an interior of said valve body and the container comprises an outlet poppet valve that is slidingly engaged about said bleed tube.

4. A shut-off valve according to claim 1, wherein said level sensor flow control means is positioned externally of said valve body.

5. A shut-off valve according to claim 1, wherein the level sensor flow control means is connected to said valve body in a flexible manner so that its position is not dictated by the position of the valve body.

6. A valve arrangement as claimed in claim 1 wherein the level sensor flow control means is selected from the group comprising pneumatic, mechanical, optical, electrical, electronic, magnetic means and equivalent means.

7. A valve arrangement as claimed in claim 1 wherein the level sensor flow control means is a float actuated valve.

* * * * *